US009363799B2

(12) United States Patent
Park et al.

(10) Patent No.: US 9,363,799 B2
(45) Date of Patent: Jun. 7, 2016

(54) METHOD FOR TRANSMITTING AN UPLINK CONTROL SIGNAL, USER EQUIPMENT, METHOD FOR RECEIVING AN UPLINK SIGNAL, AND BASE STATION

(71) Applicant: LG Electronics Inc., Seoul (KR)

(72) Inventors: Sungjun Park, Anyang-si (KR); Sunghoon Jung, Anyang-si (KR); Seungjune Yi, Anyang-si (KR); Youngdae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 14/355,519

(22) PCT Filed: Oct. 31, 2012

(86) PCT No.: PCT/KR2012/009051
§ 371 (c)(1),
(2) Date: Apr. 30, 2014

(87) PCT Pub. No.: WO2013/066044
PCT Pub. Date: May 10, 2013

(65) Prior Publication Data

US 2014/0254538 A1 Sep. 11, 2014

Related U.S. Application Data

(60) Provisional application No. 61/553,933, filed on Oct. 31, 2011.

(51) Int. Cl.

| | |
|---|---|
| ***H04W 72/04*** | (2009.01) |
| ***H04L 1/00*** | (2006.01) |
| ***H04L 1/18*** | (2006.01) |
| ***H04W 56/00*** | (2009.01) |
| ***H04L 5/00*** | (2006.01) |

(52) U.S. Cl.
CPC ......... *H04W 72/0406* (2013.01); *H04L 1/0026* (2013.01); *H04L 1/1874* (2013.01); *H04L 1/1887* (2013.01); *H04L 5/0053* (2013.01); *H04L 5/0058* (2013.01); *H04W 56/00* (2013.01)

(58) Field of Classification Search
CPC .......... H04W 76/048; H04W 52/0209; H04W 24/10; H04W 52/02
USPC .......................................... 370/329, 331, 347
See application file for complete search history.

(56) References Cited

U.S. PATENT DOCUMENTS

| | | | | |
|---|---|---|---|---|
| 8,483,624 B2 * | 7/2013 | Cai | H04L 1/18 | 340/7.32 |
| 9,014,138 B2 * | 4/2015 | Fong | H04B 7/024 | 370/331 |
| 9,119,146 B2 * | 8/2015 | Anas | H04W 72/1231 | |
| 2007/0291728 A1 * | 12/2007 | Dalsgaard | H04L 12/12 | 370/347 |
| 2009/0232118 A1 * | 9/2009 | Wang | H04L 5/0091 | 370/338 |
| 2011/0026462 A1 * | 2/2011 | Montojo | H04W 52/0216 | 370/328 |
| 2011/0294491 A1 * | 12/2011 | Fong | H04L 5/001 | 455/422.1 |

FOREIGN PATENT DOCUMENTS

| | | |
|---|---|---|
| KR | 1020070097282 | 10/2007 |
| KR | 1020080067293 | 7/2008 |
| KR | 1020100051024 | 5/2010 |
| KR | 1020100117102 | 11/2010 |
| WO | 2010147956 | 12/2010 |

* cited by examiner

*Primary Examiner* — Dang Ton
*Assistant Examiner* — Sai Aung
(74) *Attorney, Agent, or Firm* — Dentons US LLP

(57) ABSTRACT

The present invention relates to a method and apparatus for determining whether or not to transmit an uplink control signal in a first subframe according to whether or not a subframe (the first frame) corresponding to a transmission time of the uplink control signal is within an active time, or whether or not the first subframe is one of a constant number of subframes after the last subframe of the active time, and the active time is a time for the reception of resource allocation information for data retransmission.

16 Claims, 15 Drawing Sheets

(a)

(b)

METHOD FOR TRANSMITTING AN UPLINK CONTROL SIGNAL, USER EQUIPMENT, METHOD FOR RECEIVING AN UPLINK SIGNAL, AND BASE STATION

This application is a 35 USC §371 National Stage entry of International Application No. PCT/KR2012/09051 filed on Oct. 31, 2012, and claims priority to U.S. Provisional Application No. 61/553,933 filed on Oct. 31, 2011, all of which are hereby incorporated by reference in their entireties as if fully set forth herein.

TECHNICAL FIELD

The present invention relates to a wireless communication system. Specifically, the present invention relates to a method and apparatus for transmitting an uplink signal and a method and apparatus for receiving an uplink signal.

BACKGROUND ART

As an example of a wireless communication system to which the present invention is applicable, a 3rd generation partnership project long term evolution (3GPP LTE) communication system is described in brief.

FIG. 1 is a view schematically illustrating a network structure of an E-UMTS as an exemplary radio communication system. An evolved universal mobile telecommunications system (E-UMTS) is an advanced version of a conventional universal mobile telecommunications system (UMTS) and basic standardization thereof is currently underway in the 3GPP. E-UMTS may be generally referred to as a long term evolution (LTE) system. For details of the technical specifications of the UMTS and E-UMTS, reference can be made to Release 7 and Release 8 of the 3rd generation partnership project (3GPP) technical specification (TS), respectively.

Referring to FIG. 1, the E-UMTS includes a user equipment (UE), eNode Bs (eNBs), and an access gateway (AG) which is located at an end of a network (Evolved Universal Terrestrial Radio Access Network (E-UTRAN)) and connected to an external network. The eNBs may simultaneously transmit multiple data streams for a broadcast service, a multicast service, and/or a unicast service.

One eNB manages one or more cells. A cell is configured to use one of bandwidths of 1.25, 2.5, 5, 10, and 20 MHz to provide a downlink or uplink transport service to several UEs. Different cells may be set to provide different bandwidths. The eNB controls data transmission and reception for one or more UEs. The eNB transmits downlink scheduling information with respect to downlink data to notify a corresponding UE of a time/frequency region in which data is to be transmitted, coding, data size, and hybrid automatic repeat and request (HARM)-related information. In addition, the eNB transmits uplink scheduling information with respect to uplink data to a corresponding UE to inform the UE of an available time/frequency region, coding, data size, and HARQ-related information. An interface may be used for transmission of user traffic or control traffic between eNBs. A core network (CN) may include the AG, a network node for user registration of the UE, and the like. The AG manages mobility of a UE on a tracking area (TA) basis, each TA including a plurality of cells.

Although radio communication technology has been developed up to 3GPP LTE(-A) based on wideband code division multiple access (WCDMA), demands and expectations of users and providers continue to increase. In addition, since other radio access technologies continue to be developed, new advances in technology are required to secure future competitiveness. Decrease of cost per bit, increase of service availability, flexible use of a frequency band, simple structure, open interface, and suitable power consumption by a UE are required.

DETAILED DESCRIPTION OF THE INVENTION

Technical Problems

The present invention provides a method and apparatus for efficiently transmitting/receiving an uplink signal.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting an uplink control signal to a base station by a user equipment for which discontinuous reception is configured, the method including, if a subframe corresponding to a transmission timing of the uplink control signal (hereinafter, first subframe) is not within an active time, determining whether to transmit the uplink control signal in the first subframe according to whether the first subframe is one of a prescribed number of subframes after a last subframe of the active time and whether the last subframe of the active time is a subframe for receiving resource assignment information for data retransmission (hereinafter, second subframe).

In another aspect of the present invention, provided herein is a user equipment for transmitting an uplink control signal to a base station, for which discontinuous reception is configured, the user equipment including a radio frequency (RF) unit configured to transmit a signal and a processor configured to control the RF unit, wherein, if a subframe corresponding to a transmission timing of the uplink control signal (hereinafter, first subframe) is not within an active time, the processor determines whether to transmit the uplink control signal in the first subframe, according to whether the first subframe is one of a prescribed number of subframes after a last subframe of the active time and whether the last subframe of the active time is a subframe for receiving resource assignment information for data retransmission (hereinafter, second subframe), and the processor controls the RF unit according to the determination.

In another aspect of the present invention, provided herein is a method for receiving an uplink control signal from a user equipment for which discontinuous reception is configured, the method including, if a subframe corresponding to a reception timing of the uplink control signal (hereinafter, first subframe) is not within an active time, determining whether to receive the uplink control signal in the first subframe according to whether the first subframe is one of a prescribed number of subframes after a last subframe of the active time and whether the last subframe of the active time is a subframe for receiving resource assignment information for data retransmission (hereinafter, second subframe).

In another aspect of the present invention, provided herein is a base station for receiving an uplink control signal from a user equipment for which discontinuous reception is configured, the base station including a radio frequency (RF) unit configured to transmit a signal and a processor configured to control the RF unit, wherein, if a subframe corresponding to a reception timing of the uplink control signal (hereinafter, first subframe) is not within an active time, the processor determines whether to receive the uplink control signal in the first subframe according to whether the first subframe is one of a prescribed number of subframes after a last subframe of the active time and whether the last subframe of the active time is a subframe for receiving resource assignment information for data retransmission (hereinafter, second subframe).

In each aspect of the present invention, the user equipment or the base station may determine whether the first subframe is one of a prescribed number of subframes after the last subframe of the active time and, if the first subframe is one of the prescribed number of subframes, determine whether the last subframe of the active time is the second subframe.

In each aspect of the present invention, if the first subframe is not one of the prescribed number of subframes after the last subframe of the active time or if the last subframe of the active time is the second subframe, the uplink control signal may not be transmitted in the first subframe, In each aspect of the present invention, if the first subframe is one of the prescribed number of subframes after the last subframe of the active time but if the last subframe of the active time is not the second subframe, the uplink control signal may be transmitted in the first subframe In each aspect of the present invention, the uplink control signal may be at least one of a periodic channel state information report and a periodic sounding reference signal.

In each aspect of the present invention, if the uplink control signal is the periodic channel state information report, the uplink control signal may be transmitted through an uplink physical control channel.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, complexity of eNB implementation can be reduced and battery consumption of a UE can be reduced.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
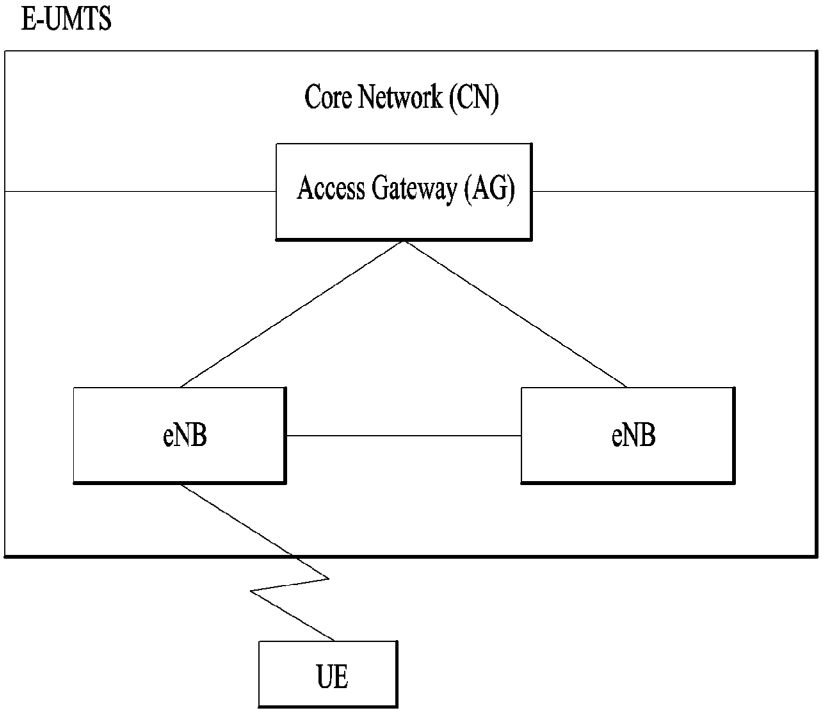
FIG. 1 is a view schematically illustrating a network structure of an E-UMTS as an exemplary radio communication system.

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the present specification, embodiments of the present invention are described focusing upon a data transmission and reception relationship between a base station (BS) and a user equipment (UE). Here, the BS refers to a terminal node of a network communicating directly with the UE. In the present specification, a specific operation described as being performed by the BS may be performed by an upper node of the BS. Namely, it is apparent that, in a network comprised of a plurality of network nodes including the BS, various operations performed for communication with the UE may be performed by the BS or network nodes other than the eNB. The term 'BS' may be replaced with the terms fixed station, Node B, eNodeB (eNB), access point, etc. The term relay may be replaced with the terms relay node (RN), relay station (RS), etc. The term 'UE' may be replaced with the terms terminal, mobile station (MS), mobile subscriber station (MSS), subscriber station (SS), etc. Hereinafter, embodiments of the present invention will be described by referring a BS to as an eNB.

In the present invention, a Physical Downlink Control Channel (PDCCH) and a Physical Downlink Shared Channel (PDSCH) are sets of time-frequency resources or resource element (REs), which carry Downlink Control Information (DCI) and downlink data, respectively. Also, a Physical Uplink Control Channel (PUCCH), a Physical Uplink Shared Channel (PUSCH), and a Physical Random Access Channel (PRACH) are sets of time-frequency resources or resource elements, which carry Uplink Control Information (UCI), uplink data, and a random access signal, respectively. In the present invention, if it is said that a user equipment UE transmits a PUCCH, a PUSCH and a PRACH, this may mean that the UE transmits UCI, uplink data and a random access signal on the PUCCH, the PUSCH and the PRACH, respectively. In addition, if it is said that an eNB transmits a PDCCH and a PDSCH, this may mean that the eNB transmits downlink data and control information on the PDCCH and the PDSCH, respectively.

Meanwhile, in the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink/uplink signal of a specific cell refers to a downlink/uplink signal from/to an eNB or a node which provides a communication service to the specific cell. Hereinafter, an eNB or an antenna group that schedules a UE connected thereto so that the UE transmits/receives an uplink/downlink signal will be especially referred to as a serving eNB or a serving antenna group, respectively. A serving cell may correspond to coverage within which the serving eNB or the serving antenna group is capable of providing a communication service.

Channel status/quality of a specific cell refers to channel status/quality of a channel or communication link formed between an eNB or node which provides a communication service to the specific cell and a UE. In a 3GPP LTE-A based system, the UE may measure a downlink channel state from a specific node using a channel state information-reference signal(s) (CSI-RS(s)) transmitted on a CSI-RS resource allocated to the specific node by an antenna port(s) of the specific node. Generally, neighboring nodes transmit corresponding CSI-RSs on orthogonal CSI-RS resources. When CSI-RS resources are orthogonal, this mean that CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

The specific terms used in the following description are provided to aid in understanding of the present invention and may be changed without departing from the spirit of the present invention.

In some instances, known structures and devices are omitted or are shown in block diagram form, focusing on important features of the structures and devices, so as not to obscure the concept of the present invention. The same reference numbers will be used throughout this specification to refer to the same or like parts.

Embodiments of the present invention can be supported by standard documents disclosed in at least one wireless access system of an IEEE 802 system, a 3GPP system, a 3GPP LTE system, an LTE-advanced (LTE-A) system, and a 3GPP2 system. Namely, among the embodiments of the present invention, steps or parts which are not described to clarify the technical features of the present invention can be supported by the above standard documents. In addition, all terms disclosed herein can be supported by the above standard documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied as radio technology such as universal terrestrial radio access (UTRA) or CDMA2000. TDMA may be embodied as radio technology such as global system for mobile communications (GSM)/general packet radio service (GPRS)/enhanced data rates for GSM evolution (EDGE). OFDMA may be embodied with radio technology such as IEEE 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long-term evolution (LTE) is part of an evolved UMTS (E-UMTS), which uses E-UTRA. 3GPP LTE employs OFDMA in downlink and employs SC-FDMA in uplink. LTE-advanced (LTE-A) is an evolved version of 3GPP LTE. WiMAX can be described by the IEEE 802.16e standard (WirelessMAN-OFDMA reference system) and advanced IEEE 802.16m standard (WirelessMAN-OFDMA advanced system). For clarity, the following description focuses on the 3GPP LTE(-A). However, technical features of the present invention are not limited thereto.

Structure of LTE System

Figure 2:
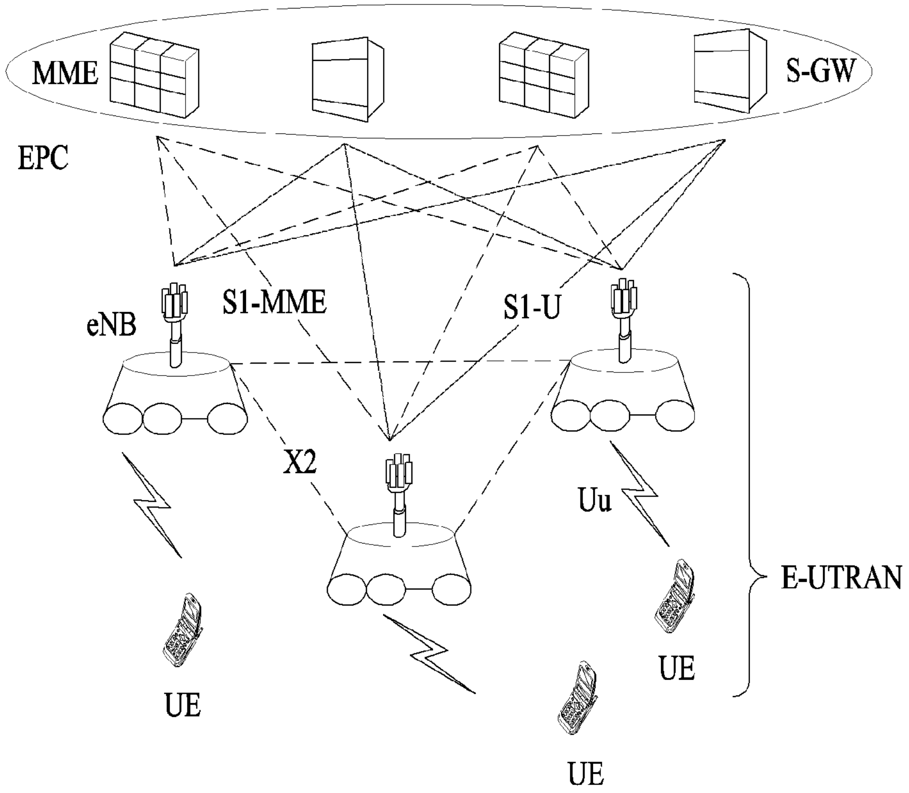
FIG. 2 is a diagram illustrating a structure of a wireless communication system.

FIG. 2 is a diagram illustrating a structure of a wireless communication system.

A system structure of the LTE system, which is an example of the wireless communication system to which the present invention may be applied, will be described with reference to FIG. 2. The LTE system is a mobile communication system evolved from the UMTS. As shown in FIG. 2, the LTE system may be divided into E-UTRAN (Evolved UMTS Terrestrial Radio Access Network) and EPC (Evolved Packet Core). The E-UTRAN includes a user equipment UE and eNB (Evolved NodeB, base station). An interface between the UE and the eNB may be referred to as Uu interface, and an interface between eNBs may be referred to as X2 interface. The EPC includes a mobility management entity (MME) and a serving-gateway (S-GW), wherein the MME serves as a control plane and the serving gateway serves as a user plane. An interface between the eNB and the MME may be referred to as S1-MME interface, and an interface between the eNB and the S-SG may be referred to as S1-U interface. The S1-MME interface and the S1-U interface may be referred to as S1 interface.

Figure 3:
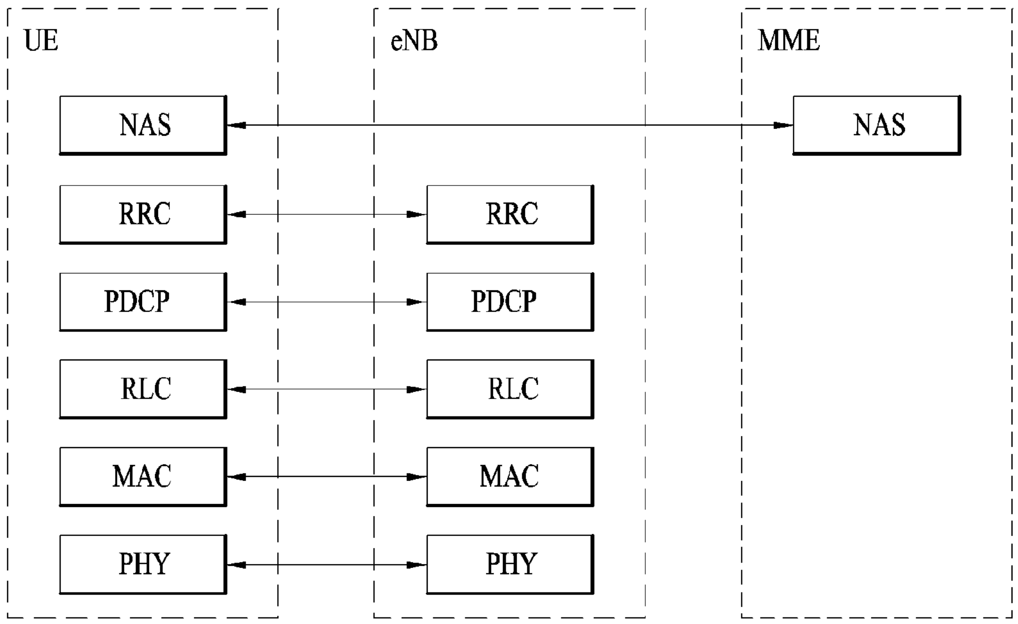
FIG. 3 and FIG. 4 are diagrams respectively illustrating a control plane and a user plane of a radio protocol.

A radio interface protocol is defined in the Uu interface which is a radio interval, and horizontally includes a physical layer, a data link layer, and a network layer, and vertically includes a user plane for data information transfer and a control plane for signaling transfer (control signal transfer). As shown in FIG. 2 and FIG. 3, the radio interface protocol may be classified into L1 (first layer) including a physical (PHY) layer, L2 (second layer) including MAC/RLC/PDCP (medium access control/radio link control/protocol data convergence protocol) layers, and L3 (third layer) including RRC layer, based on three lower layers of the open system interconnection (OSI) standard model widely known in the communications systems. These radio protocol layers exist in the user equipment UE and the E-UTRAN in pairs, and play a role in data transfer of the Uu interface.

Figure 4:
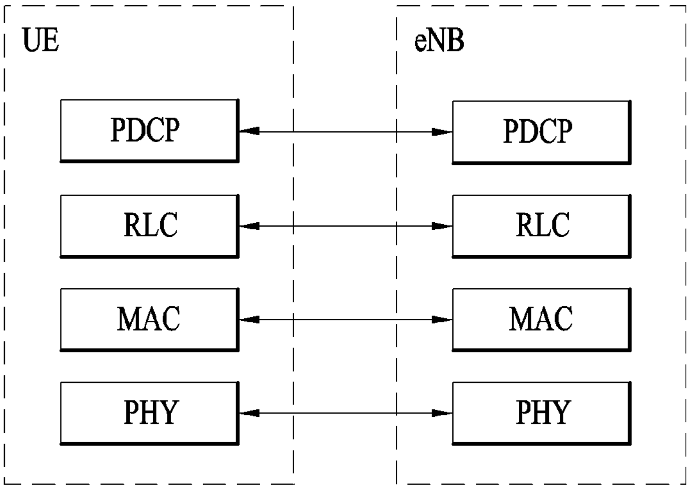

FIG. 3 and FIG. 4 are diagrams respectively illustrating a control plane and a user plane of a radio protocol.

Referring to FIG. 3 and FIG. 4, the physical (PHY) layer belonging to the first layer L1 provides an information transfer service using a physical channel. The PHY layer is connected to a medium access control (MAC) layer above the physical layer via a transport channel. Data are transferred between the medium access control layer and the physical layer via the transport channel. At this time, the transport channel is divided into a dedicated transport channel and a common transport channel depending channel sharing. Data are transferred between one physical layer of a transmitting side and the other physical layer of a receiving side through the physical channel.

Several layers exist in the second layer. First of all, the MAC layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an un-acknowledged mode (UM), and an acknowledged mode (AM) to ensure various quality of services (QoS) required by each radio bearer (RB). In particular, the AM RLC layer performs a retransmission function through automatic repeat and request (ARQ) function for reliable data transmission.

In order to effectively transmit data using IP packets such as IPv4 or IPv6 within a radio-communication interval having a narrow bandwidth, a PDCP (packet data convergence protocol) layer of the second layer performs header compression to reduce the size of IP packet header having relatively great size and unnecessary control information. The header compression is to increase transmission efficiency of the radio-communication interval by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service or logical path provided by the first and second layers of the radio protocol for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a path for transmitting an RRC message in the control plane and the DRB is used as a path for transmitting user data in the user plane. Each cell serviced by an eNB provides a downlink or uplink transmission service to one or more UEs. Downlink transport channels carrying information from a network to a UE include a broadcast channel (BCH) transmitting system information, a paging channel (PCH) transmitting paging messages, and a downlink shared channel (SCH) transmitting user traffic or control messages. Traffic or control messages of a downlink multicast or broadcast service may be transmitted via the downlink SCH or an additional downlink multicast channel (MCH). Meanwhile, uplink transport channels carrying information from the UE to the network include a random access channel (RACH) transmitting an initial control message and an uplink SCH transmitting user traffic or control messages. Logical channels, which are located above the transport channels and mapped to the transport channels, include a broadcast control channel (BCCH), a paging control channel (PCCH), a common control channel (CCCH), a multicast control channel (MCCH), and a multicast traffic channel (MTCH).

A non-access stratum (NAS) layer is defined only in the control plane of the UE and the MME. NAS control protocol is terminated in the MME on the network side and perform functions such as an evolved packet system (EPS) bearer management, authentication, EPS connection management (ECM)-idle state (ECM-IDLE) mobility handling, call origination in ECM-IDLE, and security control. To manage mobility of the UE in the NAS layer, two states are defined, i.e. an EPS mobility management (EMM)-registered state (EMM-REGISTERED) and an EMM-deregistered state (EMM-DEREGISTERED). These two states are applied to the UE and the MME. Initially, the UE is in the EMM-DEREGISTERED state. To access the network, the UE performs a process of registering to the network through an initial attach procedure. If the attach procedure is successfully performed, the UE and the MME enter the EMM-REGISTERED state.

Meanwhile, to manage a signaling connection between the UE and the EPC, an ECM-idle (ECM-IDLE) state and an ECM-connected (ECM-CONNECTED) state are defined. These two states are applied to the UE and the MME. When the UE in the ECM-IDLE state establishes an RRC connection with the E-UTRAN, the UE enters the ECM-CONNECTED state. When the MME in the ECM-IDLE state establishes an RRC connection with the E-UTRAN, the MME enters the ECM-CONNECTED state. When the UE is in the ECM-IDLE state, the E-UTRAN does not contain context information of the UE. Therefore, the UE in the ECM-IDLE state performs a UE-based mobility related procedure such as cell selection or reselection without receiving a command of the network. On the other hand, when the UE is in the ECM-CONNECTED state, mobility of the UE is managed by the command of the network. If a location of the UE in the ECM-IDLE state becomes different from a location known to the network, the UE reports the location thereof to the network through a tracking area (TA) update procedure.

Hereinafter, an RRC state and RRC connection method of the UE will be described. The RRC state refers to whether or not the RRC layer of the UE is logically connected to the RRC layer of the E-UTRAN. If connected, then it is called an RRC_CONNECTED state and, otherwise, it is called an RRC_IDLE state.

Specially, when the UE is initially turned on by a user, the UE first searches for a suitable cell and then camps in the suitable cell in an RRC_IDLE state. The E-UTRAN cannot recognize the UE in the RRC_IDLE state in a cell unit, and therefore, a core network (CN) manages the UE in a tracking area (TA) unit, which is a unit larger than a cell. The UE in the RRC_IDLE state may receive broadcast system information and paging information while performing discontinuous reception (DRX) configured by the NAS and may be assigned a UE-specific identity. In addition, the UE in the RRC_IDLE state may perform selection and reselection of a public land mobile network (PLMN).

To receive services such as voice or data from the cell, the UE in the RRC_IDLE state should perform transition to an RRC_CONNECTED state. The UE in the RRC_IDLE state establishes an RRC connection with RRC of the E-UTRAN through an RRC connection establishment procedure only when it is required to make an RRC connection, thereby changing the state to the RRC_CONNECTED state. There are several cases when the UE in the RRC_IDLE state is required to make an RRC connection. For example, uplink data transmission is required due to a phone call attempt by the user or transmission of a response message is required in response to a paging message received from the E-UTRAN.

Figure 5:
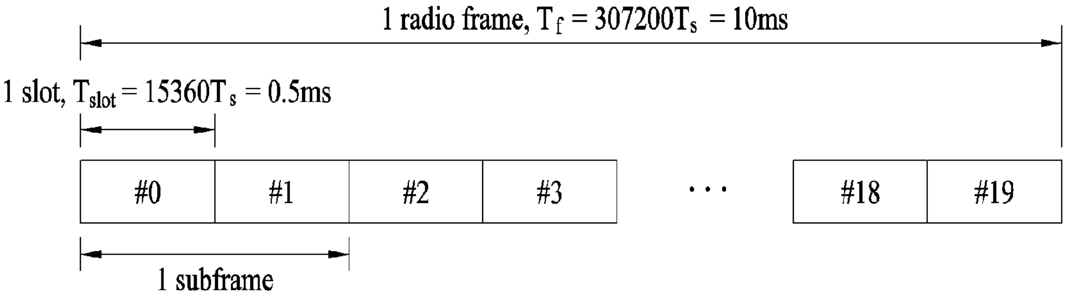
FIG. 5 illustrates the structure of a radio frame in which a physical channel(s) is defined in a wireless communication system.

FIG. 5 illustrates the structure of a radio frame used in a wireless communication system. Particularly, the structure of the radio frame of FIG. 5 may be used in frequency division duplex (FDD) mode and time division duplex (TDD) mode.

Referring to FIG. 5, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s$=1/(2048*15 kHz). Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. The length of the DwPTS and the length of the UpPTS differ according to DL-UL configuration.

In a 3GPP LTE/LTE-A system, one subframe includes two slots. A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/IL}_{RB}*N^{RB}_{sc}-1$ in the frequency domain, and l is an index ranging from 0 to $N^{DL/UL}_{symb}1-1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 6:
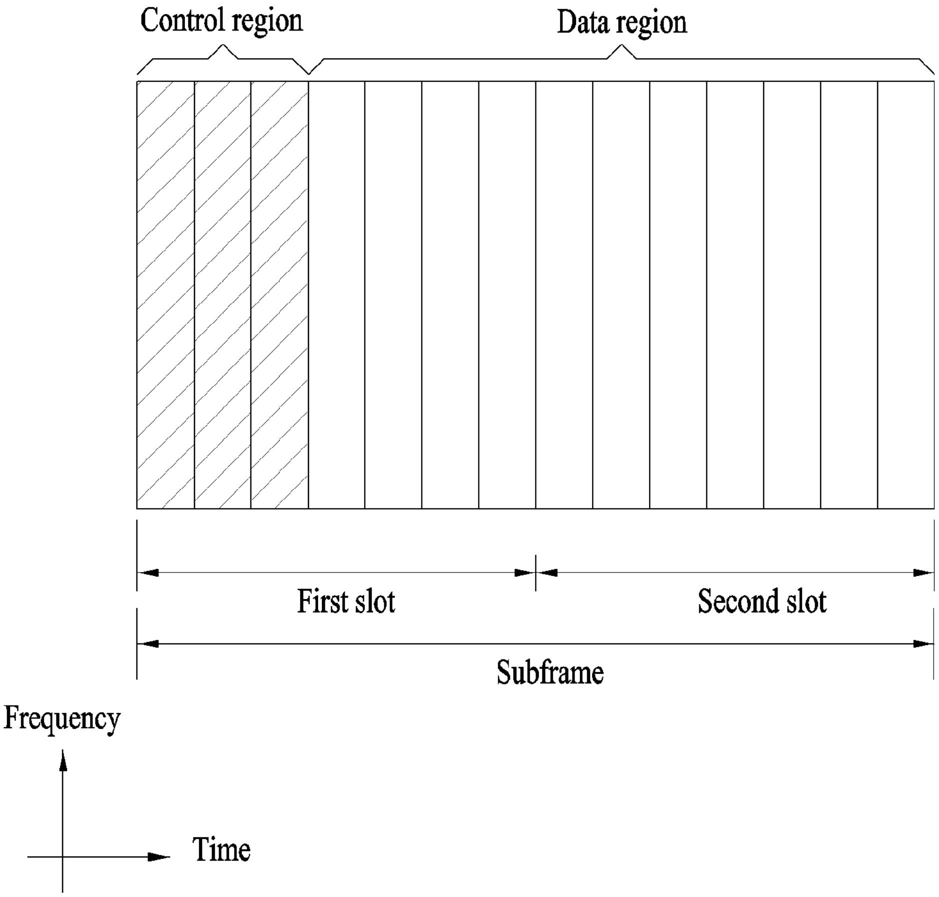
FIG. 6 illustrates the structure of a DL subframe used in a 3GPP ($3^{rd}$ Generation Partnership Project) LTE (Long Term Evolution)/LTE-A (Advanced) system.

FIG. 6 illustrates the structure of a DL subframe used in a 3GPP LTE(-A) system.

A DL subframe is divided into a control region and a data region in a time domain. Referring to FIG. 6, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI).

The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmit power control commands of individual UEs within a UE group, transmit power control information, and activity information of voice over Internet protocol (VoIP). The size and usage of the DCI carried by one PDCCH are varied depending on DCI formats. The size of the DCI may be varied depending on a coding rate. In the current 3GPP LTE system, various formats are defined, wherein format 0 is defined for UL, and formats 1, 1A, 1B, 1C, 1D, 2, 2A, 2B, 2C, 3, and 3A are defined for DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DMRS), UL index, channel quality information (CQI) request, DL assignment index, HARQ process number, transmitted precoding matrix indicator (TPMI), precoding matrix indicator (PMI) information is transmitted to the UE as the DCI.

The eNB may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 7:
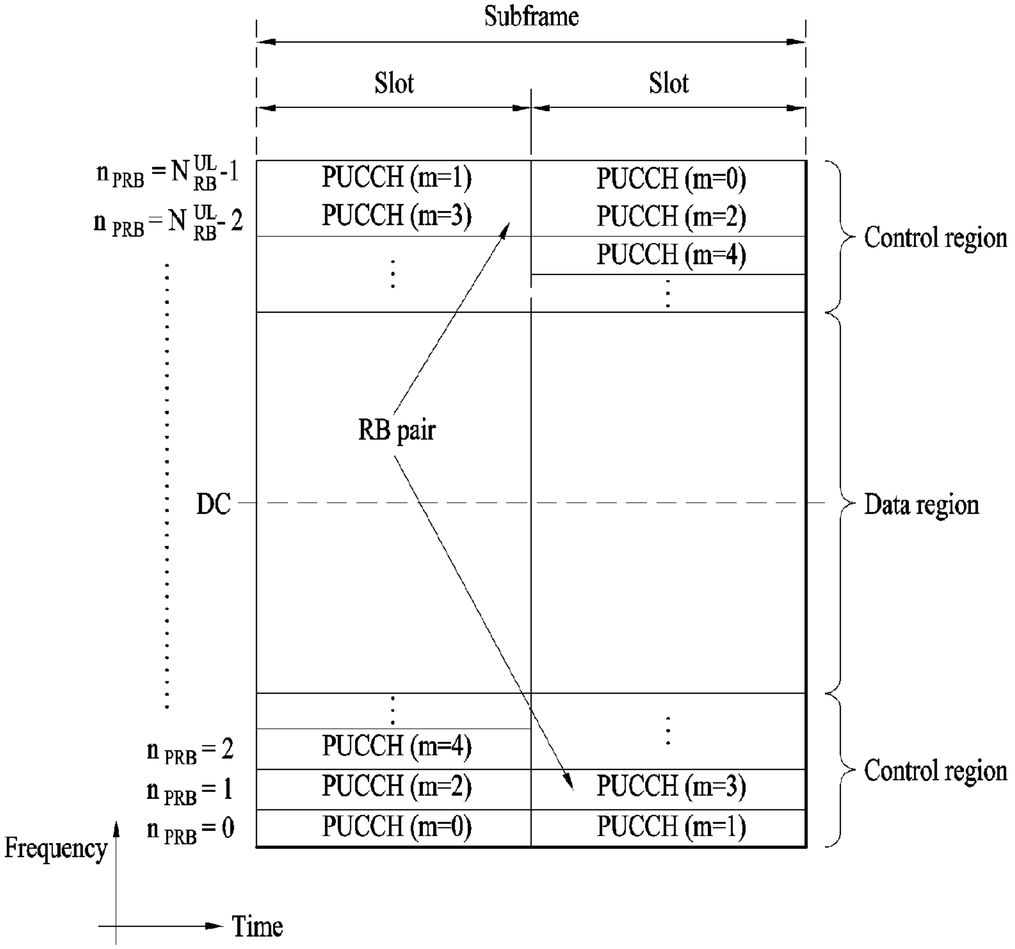
FIG. 7 illustrates the structure of a UL subframe used in a 3GPP LTE/LTE-A system.

FIG. 7 illustrates the structure of a UL subframe used in a 3GPP LTE(-A) system.

Referring to FIG. 7, a UL subframe may be divided into a data region and a control region in the frequency domain. One or several PUCCHs may be allocated to the control region to deliver UCI. One or several PUSCHs may be allocated to the data region of the UE subframe to deliver user data. A PUSCH may be transmitted together with a DMRS which is a reference signal (RS) for demodulating user data transmitted therethrough. The control region and the data region in the UL subframe may also be referred to as a PUCCH region and a PUSCH region, respectively.

A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence. A UE transmits an SRS on an SRS resource with respect to each carrier configured therefor, based on two trigger types: trigger type 0 of higher-layer signaling and trigger type 1 of DCI format 0/4/1A for FDD and DCI format 2B/2C for TDD. Describing trigger type 0 in more detail, the UE may be configured with SRS parameters for trigger type 0. Parameters, such as a UE-specific parameter "Transmission comb $k_{TC}$" used for mapping of SRS transmission to a physical resource, starting physical resource block assignment $n_{RRC}$ used to determine the location of an SRS in the frequency domain, duration of SRS transmission, and srs-ConfigIndex $I_{SRS}$ for SRS transmission periodicity $T_{SRS}$ and an SRS subframe offset $T_{offset}$, may be semi-statically configured for trigger type 0 by higher layers. Among these parameters, $I_{SRS}$ indicates an interval of subframes (or milliseconds) at which an SRS is transmitted and a relative position of a subframe at which SRS transmission is configured. An eNB may inform the UE in which subframe the UE should transmit an SRS by transmitting $I_{SRS}$ to the UE. For example, the UE may determine that a subframe satisfying the following equation for FDD and for TDD with $T_{SRS}>2$, based on $T_{SRS}$ and $T_{offset}$ corresponding to $I_{SRS}$ is a type-0-triggered SRS transmission instance.

$$(10\cdot n_f+k_{SRS}-T_{offset})\bmod T_{SRS}=0 \quad \text{[Equation 1]}$$

In Equation 1, $n_f$ is a system frame number (SFN). For FDD, $k_{SRS}\in\{0, 1, \ldots, 9\}$ is a subframe index (i.e. a subframe number) within a radio frame and, for TDD, $k_{SRS}$ is a value defined according to TDD UL-DL configuration and UpPTS length. The UE may determine that an SRS transmission instance for TDD with $T_{SRS}=2$ is a subframe satisfying "$(k_{SRS}-T_{offset})$ modulo 5=0".

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The PUCCH may be used to transmit the following control information.

- Scheduling request (SR): SR is information used to request a UL-SCH resource and is transmitted using an on-off keying (OOK) scheme.
- HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

CSI may be configured to be periodically or a periodically transmitted. Periodic CSI may be transmitted on a PUCCH. A UE may be semi-statically configured to periodically transmit the CSI on the PUCCH through higher-layer signaling from an eNB. The eNB informs the UE of a CSI type and a CSI transmission period that the UE should transmit, through higher-layer signaling. The UE may periodically transmit CSI reporting configured by the eNB in a subframe in which the CSI reporting is allocated/configured. For example, $I_{CQI/PMI}$ indicating a period $N_{pd}$ and an offset $N_{OFFSET,CQI}$ for CQI/PMI reporting may be provided to the UE by higher-layer signaling and the UE may determine in which subframe the CQI/PMI reporting should be transmitted, based on $I_{CQI/PMI}$. For instance, if wideband CQI/PMI reporting is configured, the UE may determine that subframes satisfying the following equation are reporting instances for wideband CQI/PMI.

$$(10\times n_f+\lfloor n_s/2\rfloor-N_{OFFSET,CQI})\mathrm{mod}(N_{pd})=0 \quad \text{[Equation 2]}$$

Here, $n_f$ is a system subframe number (SFN) and $n_s$ is a slot number within a radio frame.

Meanwhile, a UE detects a PDCCH carrying a UL grant therefor in subframe n and performs PUSCH transmission according to the UL grant after a predetermined number of subframes. As an example, for FDD and normal HARQ operation, if a PDCCH carrying a UL grant and/or PHICH transmission is detected in subframe #n, the UE performs corresponding PUSCH (re)transmission in SF #n+4 according to PDCCH and PHICH information. For TDD, if a PDCCH carrying a UL grant and/or PHICH transmission is detected in subframe #n, the UE may perform PUSCH (re) transmission in SF #n+$k_{PUSCH}$ according to $k_{PUSCH}$ given per TDD DL-UL configuration. The following table shows $k_{PUSCH}$ per TDD DL-UL configuration.

TABLE 2

| TDD DL-UL | DL subframe number n | | | | | | | | | |
|---|---|---|---|---|---|---|---|---|---|---|
| configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Meanwhile, for PUSCH transmission scheduled in SF #n, the UE determines a corresponding PHICH resource in SF #n+$k_{PUSCH}$. For FDD, $k_{PUSCH}$ is 4. For TDD, $k_{PUSCH}$ may be given as follows.

TABLE 3

| TDD | UL subframe number n | | | | | | | | | |
|---|---|---|---|---|---|---|---|---|---|---|
| UL-DL configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |

TABLE 3-continued

| TDD | UL subframe number n | | | | | | | | | |
|---|---|---|---|---|---|---|---|---|---|---|
| UL-DL configuration | 0 | 1 | 2 | 3 | 4 | 5 | 6 | 7 | 8 | 9 |
| 4 | | | 6 | 6 | | | | | | |
| 5 | | | 6 | | | | | | | |
| 6 | | | 4 | 6 | 6 | | | 4 | 7 | |

In Table 3, $k_{PHICH}$ defines a corresponding PHICH timing based on a UL subframe in which a PUSCH is transmitted. $k_{PHICH}$ may be redefined as a new parameter (hereinafter, k) defining a corresponding PUSCH transmission timing based on a DL subframe in which a PHICH is transmitted. Table 4 shows k per TDD DL-UL configuration.

TABLE 4

| TDD DL-UL | DL subframe number i | | | | | | | | | |
|---|---|---|---|---|---|---|---|---|---|---|
| configuration | 0 | 1 | 2 | 3 | 4 | 5 | 6 | 7 | 8 | 9 |
| 0 | 7 | 7 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

In Table 4, a number defined in a DL subframe per DL-UL configuration corresponds to k. For example, referring to Table 4, k of DL SF #3 in DL-UL configuration #2 is 6. For FDD, the UE receives ACK/NACK associated with PUSCH transmission in SF #i−4 on a PHICH allocated to the UE in SF #i. For TDD, the UE receives ACK/NACK associated with PUSCH transmission in SF #i−k on a PHICH allocated to the UE in SF #i. In other words, for PUSCH transmission scheduled in SF #n, the UE determines a corresponding PHICH resource in SF #n+k.

Referring to Tables 3 and 4, DL SF #i of Table 4 corresponds to DL SF #n+$k_{PHICH}$ of Table 3 and UL SF #i−k of Table 4 corresponds to UL SF #n of Table 3.

Next, an error control method is described. In DL, a BS schedules one or more RBs to a UE selected according a determined scheduling rule and transmits data to the UE using allocated RBs. Hereinafter, scheduling information for DL transmission is referred to as DL grant and a PDCCH carrying the DL grant is referred to as a DL grant PDCCH. Hereinafter, scheduling information for UL transmission is referred to as a UL grant and a PDCCH carrying the UL grant is referred to as a UL grant PDCCH. An error control method for data transmission includes an automatic repeat request (ARQ) scheme and a hybrid ARQ (HARQ) scheme of a more evolved form. Both the ARQ scheme and the HARQ scheme waits for an ACK signal after data (e.g. a transport block or a codeword) is transmitted. A receiving device transmits the ACK signal only upon correctly receiving the data. Upon occurrence of an error in the received data, the receiving device transmits a NACK signal. A transmitting device transmits data after receiving an ACK signal. However, upon receiving the NACK signal, the transmitting device retransmits data. The ARQ scheme and the HARQ scheme are different in an error processing method during occurrence of error data. In the ARQ scheme, error data is deleted from a buffer of the receiving device and is no longer used in subsequent processes. On the other hand, in the HARQ scheme, the error data is stored in a HARQ buffer and combined with retransmission data in order to raise a reception success rate.

In a 3GPP LTE(-A) system, error control is performed using the ARQ scheme in a radio link control (RLC) layer and the HARQ scheme in a medium access control (MAC) layer/physical (PHY) layer. The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, a BS and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HARQ scheme, since the retransmission timing and retransmission resource allocation are determined by the system, almost no overhead occurs but retransmission efficiency is very low if this scheme is used in an environment in which the channel state is considerably changed. In current 3GPP LTE (-A), the asynchronous HARQ scheme is used in DL and the synchronous HARQ scheme is used in UL.

Figure 8:
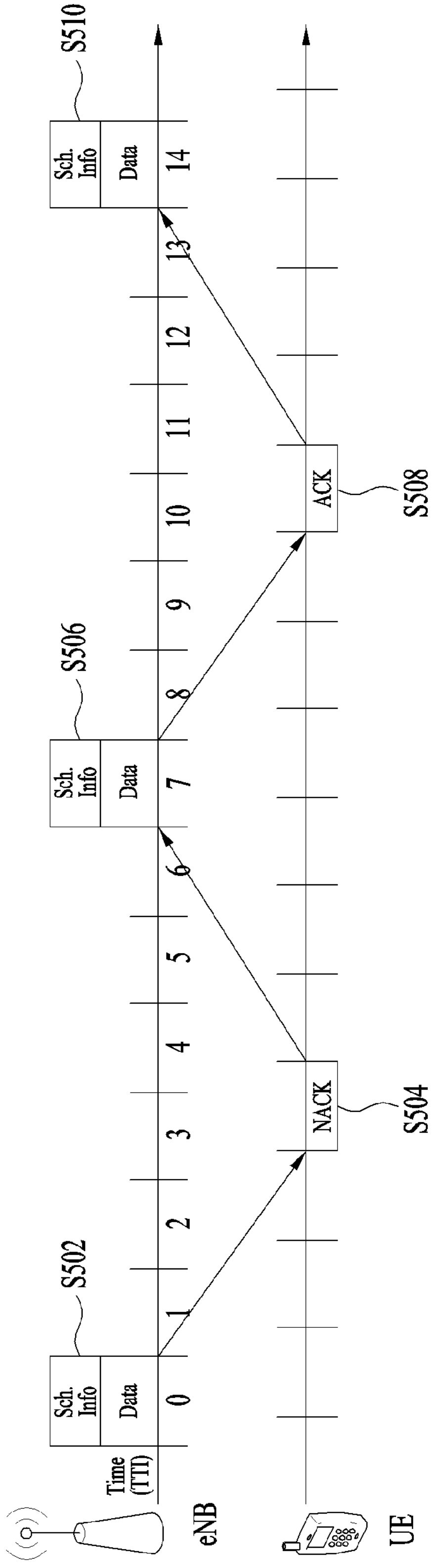
FIG. 8 illustrates a resource allocation and retransmission process of an asynchronous DL HARQ scheme.

FIG. 8 illustrates a resource allocation and retransmission process of an asynchronous DL HARQ scheme.

Referring to FIG. 8, a BS transmits scheduling information (Sch. Info)/data (e.g. a transport block or a codeword) to a UE (S502) and waits for reception of ACK/NACK from the UE. Upon receiving NACK from the UE (S504), the BS retransmits scheduling information/data to the UE (S506) and waits for reception of ACK/NACK from the UE. Upon receiving ACK from the UE (S508), a HARQ process is ended. Next, if new data transmission is needed, the BS may transmit new data and scheduling information about the new data to the UE (S510).

Meanwhile, referring to FIG. 8, a time delay occurs until the ACK/NACK is received from the UE and the retransmission data is transmitted, after the scheduling information/data is transmitted (S502). This time delay occurs due to channel propagation delay and time consumed for data decoding/encoding. Accordingly, when new data is transmitted after a current HARQ process is ended, a gap in data transmissions occurs due to the time delay. A plurality of independent HARQ processes is used for gapless data transmission during a delay period. For example, if an interval between initial transmission and retransmission is 7 subframes, data can be transmitted without a gap by performing 7 independent HARQ processes. In the plural parallel HARQ processes, UL/DL transmission is successively performed while the BS waits for reception of HARQ feedback for previous UL/DL transmission. Each HARQ process is associated with a HARQ buffer of a MAC layer. Each HARQ process manages state parameters regarding the number of transmissions of a MAC physical data unit (PDU) in a buffer, HARQ feedback for the MAC PDU in the buffer, and a current redundancy version.

Specifically, in 3GPP LTE(-A) FDD, a maximum of 8 DL HARQ processes is allocated. When carrier aggregation (CA) in which a plurality of carriers is aggregated is configured, a maximum of 8 DL HARQ processes may be allocated per carrier configured for a UE. In 3GPP LTE(-A) TDD, a maximum number of DL HARQ processes varies with UL-DL configuration. If CA is configured, a maximum number of DL HARQ processes differs per carrier configured for the UE according to TDD UL-DL configuration of a corresponding carrier. Table 5 shows a maximum number of asynchronous DL HARQ processes in TDD.

TABLE 5

| TDD UL-DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

For TDD, a maximum number of DL HARQ processes per carrier configured for the UE is determined depending upon TDD UL-DL configuration. For FDD, there may be 8 DL/UL HARQ processes per carrier configured for the UE and there may be HARQ processes corresponding to a number according to TDD UL-DL configuration per carrier configured for one UE.

In 3GPP LTE(-A) FDD, in a non-MIMO operation, 8 UL HARQ processes are allocated per carrier configured for the UE. In 3GPP LTE(-A) TDD, the number of UL HARQ processes varies with UL-DL configuration. Table 6 shows the number of synchronous UL HARQ processes in TDD.

TABLE 6

| TDD UL-DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

Figure 9:
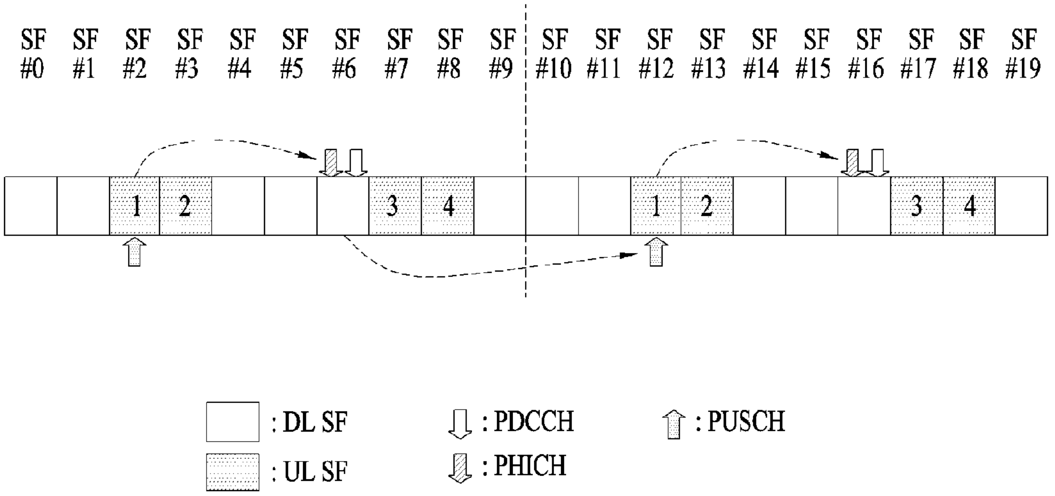
FIG. 9 illustrates a synchronous UL HARQ process in UL-DL configuration #1.

FIG. 9 illustrates a synchronous UL HARQ process in UL-DL configuration #1. In FIG. 9, a number in a box denotes a UL HARQ process number. An example of FIG. 9 illustrates a normal UL HARQ process.

Referring to FIG. 6, HARQ process #1 is associated with subframes (SFs) SF #2, SF #6, SF #12, and SF #16. For example, if an initial PUSCH signal (e.g. a redundancy version (RV)=0) is transmitted in SF #2, a UL grant PDCCH and/or a PHICH, corresponding to the PUSCH signal, may be received in SF #6 and a corresponding (retransmission) PUSCH signal (RV=2) may be transmitted in SF #12. Therefore, in UL-DL configuration #1, 4 UL HARQ processes, a round trip time (RTT) of which is 10 SFs (or 10 ms), are present.

[Discontinuous Reception (DRX)]

To reduce battery consumption of a UE, the UE may be configured to perform a DRX operation and/or a DTX operation. A UE operating in DRX mode repeatedly turns on and off reception capabilities thereof and a UE operating in DTX mode repeatedly turns on and off transmission capabilities thereof. The present invention relates to the DRX operation and, therefore, the DRX operation will be described below in more detail. First, in describing the embodiments of the present invention related to DRX, terms defined as follows are used.

Active Time: Specifies a DRX related time during which a UE monitors a PDCCH in a PDCCH-subframe.

mac-ContentionResolutionTimer: This parameter specifies the number of consecutive subframe(s) during which a UE should monitor a PDCCH after Msg3 is transmitted.

DRX Cycle: This parameter specifies the periodic repetition of On Duration followed by a possible period of inactivity.

drx-InactivityTimer: This parameter specifies the number of consecutive PDCCH-subframe(s) after successfully decoding a PDCCH indicating initial UL or DL user data transmission for a UE.

drx-RetransmissionTimer: This parameter specifies the maximum number of PDCCH-subframe(s) during which DL retransmission is expected by a UE.

drxShortCycleTimer: This parameter specifies the number of consecutive subframe(s) that the UE is required to follow Short DRX Cycle.

drxStartOffset: This parameter specifies a subframe in which DRX Cycle starts.

HARQ round trip time (RTT) Timer: This parameter specifies the minimum number of subframes before DL HARQ retransmission is expected by a UE.

Msg3: Message transmitted on a UL-SCH containing a cell (C)-RNTI medium access control (MAC) control element (CE) or a common control channel (CCCH) service data unit (SDU), submitted from a higher layer and associated with a UE contention resolution identity, as part of a random access procedure.

on DurationTimer: Specifies the number of consecutive PDCCH-subframe(s) at the beginning of a DRX Cycle.

PDCCH-subframe: This refers to a subframe with a PDCCH or, for a relay node (RN) with an R-PDCCH configured and not suspended, to a subframe with an R-PDCCH. For FDD UE behavior, the PDCCH-subframe may represent any subframe and, for TDD UE behavior, the PDCCH-subframe may represent only a DL subframe and a subframe including a DwPTS. For RNs with an RN subframe configuration configured and not suspended, in communication between an RN and an E-UTRAN, the PDCCH-subframe may represent all DL subframes configured for RN communication with the E-UTRAN.

Each of the above-mentioned timers is running once it is started, until it is stopped or until it expires and is otherwise not running. The timer can be started if it is not running or restarted if it is running. The timer is always started or restarted from its initial value.

DRX refers to a scheme for causing a UE to discontinuously receive a DL channel so that the UE can reduce battery consumption. For example, if DRX is configured, the UE attempts to receive a PDCCH, which is a DL channel, only during a determined time interval and does not attempt to receive the PDCCH during the other intervals. In this case, a time duration during which the UE should attempt to receive the PDCCH is referred to as On Duration and this On Duration is defined once every DRX Cycle.

The UE attempts to receive a PDCCH during at least an On Duration within one DRX Cycle and the DRX Cycle used in this case is divided into Long DRX Cycle and Short DRX Cycle according to the length thereof. The Long DRX Cycle can minimize battery consumption of the UE and the Short DRX Cycle can minimize a data transmission delay.

When the UE receives the PDCCH in the On Duration, additional transmission or retransmission may occur in a duration other than the On Duration. Accordingly, the UE needs to attempt to receive the PDCCH in a time duration during which additional transmission or retransmission may occur even though the time duration is not the On Duration. That is, the UE attempts to receive the PDCCH in a time duration during which on DurationTimer for managing an On Duration, drx-InactivityTimer for managing inactivity, or drx-RetransmissionTimer for managing retransmission is running. In addition, even when the UE is performing a random access procedure or the UE attempts to receive a UL grant after sending a scheduling request, the UE attempts to receive a PDCCH carrying the UL grant. Thus, a time duration during which the UE should attempt to receive the PDCCH is collectively referred to as Active Time. The Active Time consists of an On Duration during which the UE periodically attempts to receive the PDCCH and a time duration during which the UE attempts to receive the PDCCH upon triggering of an event.

Figure 10:
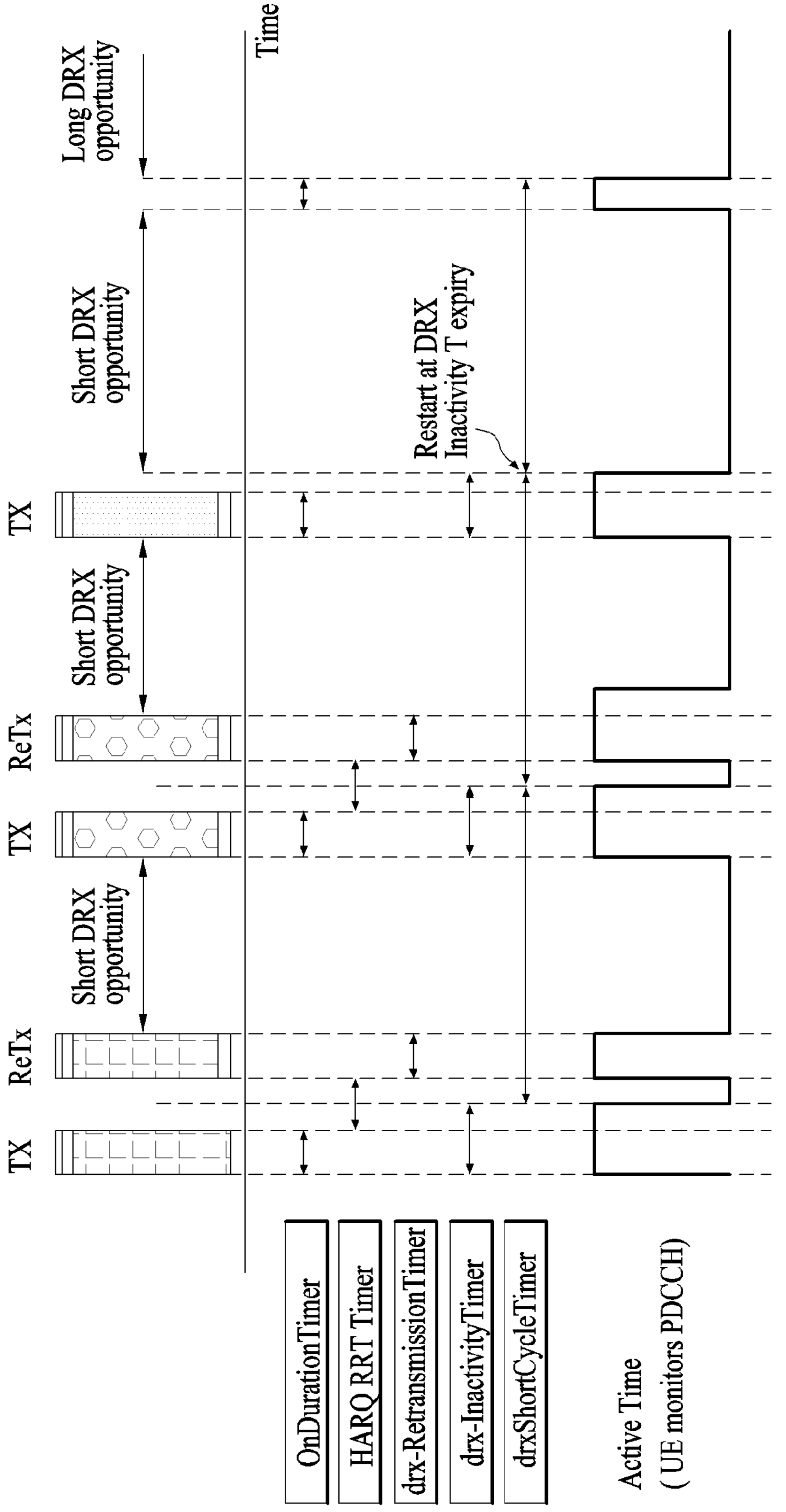
FIG. 10 illustrates a DRX (Discontinuous Reception) operation in a 3GPP LTE system.

FIG. 10 illustrates an exemplary DRX operation in a 3GPP LTE system.

A UE may be configured by RRC with a DRX functionality that controls the UE's PDCCH monitoring activity for a C-RNTI used for RRC connection and scheduling identification, a TPC-PUCCH-RNTI used for power control of a PUCCH, a TPC-PUSCH-RNTI used for power control of a PUSCH, and a semi-persistent scheduling C-RNTI (if configured) used for semi-static scheduling. When in RRC_CONNECTED, if DRX is configured, the UE is allowed to monitor the PDCCH discontinuously using DRX operation. When using the DRX operation, the UE monitors the PDCCH according to requirements which will be described later. RRC controls the DRX operation by configuring timers of on DurationTimer, drx-InactivityTimer, drx-RetransmissionTimer, longDRX-Cycle, drxStartOffset, and optionally drxShortCycleTimer and shortDRX-Cycle. A HARQ RTT timer is also defined per DL HARQ process. Only a value of a HARQ RTT timer is fixed to 8 ms and values of the other timers (e.g. on DurationTimer, drx-InactivityTimer, drx-Retransmission-Timer, or mac-ContentionResolutionTimer) are configured by an eNB through RRC signaling. The longDRX-Cycle and shortDRX-Cycle are also configured by the eNB through RRC signaling. Meanwhile, the eNB limits CQI/PMI/PTI/RI reports of the UE to the On Duration of a DRX Cycle using cqi-Mask, which is a value configured by a higher layer (e.g. RRC layer). The eNB may command the UE to transition to a DRX state by transmitting a DRX command MAC CE to the UE. As will be described later, upon receiving the DRX command MAC CE from the eNB, the UE transitions to a short DRX state if a Short DRX Cycle is configured and, otherwise, the UE transitions to a long DRX state. The DRX command MAC CE is identified through a logical channel ID (LCID) of a MAC PDU subheader.

When a DRX cycle is configured, Active Time includes the following time:

- time while on DurationTimer, drx-InactivityTimer, drx-RetransmissionTimer, or mac-ContentionResolutionTimer is running; or
- time while a scheduling request is sent on a PUCCH and is pending; or
- time while a UL grant for pending HARQ retransmission can occur and there is data in a corresponding HARQ buffer; or
- time while a PDCCH indicating initial transmission of new data corresponding to a C-RNTI of the UE after successful reception of a random access response to a preamble not selected by the UE.

When DRX is configured, the UE should perform the following operation for each subframe.

- If a HARQ RTT timer expires in this subframe and data in a soft buffer of a corresponding HARQ process has not been successfully decoded:
  - start drx-RetransmissionTimer for the corresponding HARQ process.
- If a DRX command MAC CE is received:
  - stop on DurationTimer;
  - stop drx-InactivityTimer.
- If drx-InactivityTimer expires or a DRX command MAC CE is received in this subframe:
  - if Short DRX Cycle is configured:
    - start or restart drxShortCycleTimer;
    - use the Short DRX Cycle.
  - Else:
    - use Long DRX Cycle.
- If drxShortCycleTimer expires in this subframe:
  - use the Long DRX Cycle.
- If the Short DRX Cycle is used [(SFN*10)+subframe number] modulo (shortDRX-Cycle)=(drxStartOffset) modulo (shortDRX-Cycle); or
- If the Long DRX Cycle is used [(SFN*10)+subframe number] modulo (longDRX-Cycle)=drxStartOffset:
  - start on DurationTimer.
- During Active Time, for a PDCCH-subframe, if the subframe is not required for UL transmission for a half-duplex FDD UE and if the subframe is not part of a configured measurement gap:
  - monitor a PDCCH.
  - If the PDCCH indicates DL transmission or if DL assignment has been configured for this subframe:
    - start the HARQ RTT timer for the corresponding HARQ process;
    - stop drx-RetransmissionTimer for the corresponding HARQ process.
  - If the PDCCH indicates a new (DL or UL) transmission:
    - start or restart drx-InactivityTimer.
- When not in Active Time, type-0-triggered SRS should not be reported.
- If CQI masking (cqi-Mask) is setup by higher layers:
  - when on DurationTimer is not running, channel quality indicator (CQI)/precoding matrix indicator (PMI)/rank indicator (RI)/precoding type indicator (PTI) on a PUCCH should not be reported.
- Else:
  - When not in Active Time, CQI/PMI/RI/PTI on the PUCCH should not be reported.

Regardless of whether the UE is monitoring the PDCCH or not, the UE receives and transmits HARQ feedback and transmits type-1-triggered SRS when such is expected.

NOTE: A UE may optionally choose to not send CQI/PMI/RI/PTI reports on a PUCCH and/or type-0-triggered SRS transmissions for up to 4 subframes following a PDCCH indicating new (UL or DL) transmission. The choice not to send CQI/PMI/RI/PTI reports on the PUCCH and/or type-0-triggered SRS transmissions is not applicable to subframes where on DurationTimer is running.

NOTE: The same active time applies to resources operating on all activated serving carrier(s).

Figure 11:
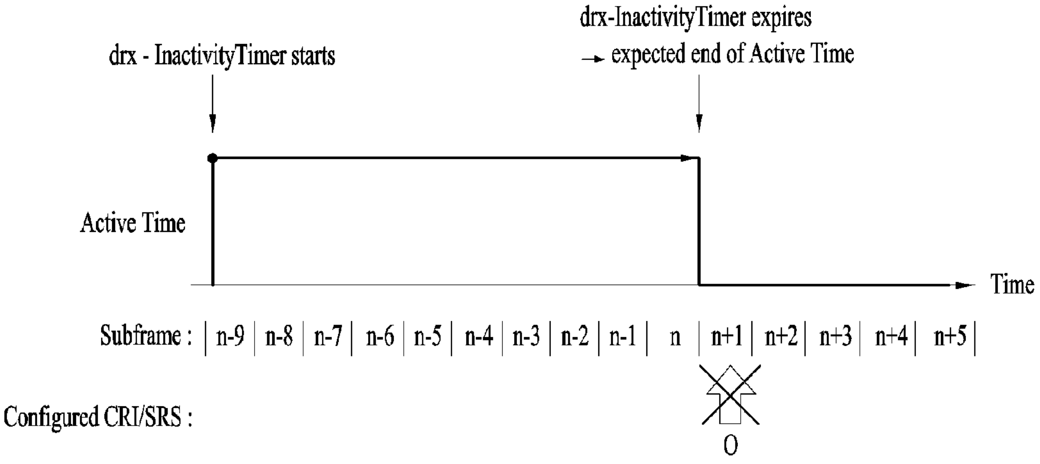
FIG. 11 explains problems of a conventional wireless system.
Figure 11:
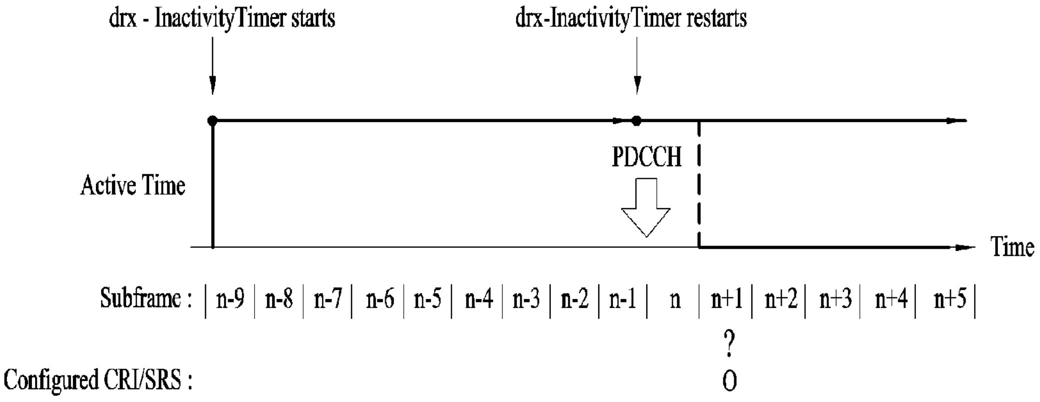

FIG. 11 explains problems of a conventional wireless system.

Referring to FIG. 11, a UE is configured to transmit CSI and/or an SRS (hereinafter, CSI/SRS) in subframe n+1. Upon starting drx-InactivityTimer of 10 ms in subframe n−9, the UE estimates that the drx-InactivityTimer will be ended in subframe n+1. That is, the UE estimates that time starting from subframe n−9 to subframe n is an active time and that time starting from subframe n+1 is an inactive time. Referring to FIG. 11(*a*), if the drx-InactivityTimer has normally expired, since subframe n+1 which is a transmission timing of CSI/SRS is not an active time, the UE does not transmit configured CSI/SRS.

However, referring to FIG. 11(*b*), upon receiving a PDCCH in subframe n, the UE restarts the drx-InactivityTimer from an initial value and, then, an active time is prolonged and subframe n+1 also becomes the active time. In this case, according to a conventional 3GPP LTE system, the UE needs to perform CSI/SRS transmission in subframe n+1. However, since the UE has expected that subframe n+1 is an inactive time before receiving the PDCCH in subframe n, a preparation time for CSI/SRS transmission in subframe n+1 may be insufficient and the UE may not perform CSI/SRS transmission configured by an eNB in subframe n+1. Consequently, since it is uncertain whether the UE reports CSI/SRS to the eNB in subframe n+1, the eNB should attempt to perform decoding with respect to both the case in which CSI/SRS transmission is performed and the case in which CSI/SRS transmission is not performed and this increases complexity of eNB implementation. Further, when a CSI transmission timing collides with a HARQ ACK/NACK transmission timing, since it is not certain whether CSI is multiplexed with HARQ ACK/NACK and then is transmitted by the UE or CSI transmission is dropped and only HARQ ACK/NACK is transmitted by the UE, complexity of eNB implementation is further increased.

Accordingly, the present invention proposes that the UE operate as follows.

- If an active time is unexpectedly prolonged, configured CSI/SRS is transmitted during four subframes after expected end of the active time.
- If an active time is expectedly or unexpectedly ended, configured CSI/SRS is transmitted during four subframes after (expected) end of the active time.
- Exceptionally, the UE does not transmit configured CSI/SRS during four subframes following a subframe with data in a corresponding HARQ buffer if a UL grant for pending HARQ retransmission may occur.

That is, the present invention proposes that the UE transmit CSI/SRS during a predetermined number of subframe(s) after the last subframe of an active time, when a current subframe is the last subframe of the active time and the active time is not an active time for receiving DCI (i.e. a UL grant) for UL radio resource assignment for HARQ retransmission.

For example, the present invention is carried out as follows.

When a DRX cycle is configured, Active Time includes the following time:

time while on DurationTimer, drx-InactivityTimer, drx-RetransmissionTimer, or mac-ContentionResolution-Timer is running; or time while a scheduling request is sent on a PUCCH and is pending; or time while a UL grant for pending HARQ retransmission can occur and there is data in a corresponding HARQ buffer; or time while a PDCCH indicating initial transmission of new data corresponding to a C-RNTI of the UE after successful reception of a random access response to a preamble not selected by the UE.

When DRX is configured, the UE performs the following operation for each subframe.

If a HARQ RTT timer expires in this subframe and data in a soft buffer of a corresponding HARQ process has not been successfully decoded:

start drx-RetransmissionTimer for the corresponding HARQ process.

If a DRX command MAC CE is received:

stop on DurationTimer;

stop drx-InactivityTimer.

If drx-InactivityTimer expires or a DRX command MAC CE is received in this subframe:

if Short DRX Cycle is configured:

start or restart drxShortCycleTimer;

use the Short DRX Cycle.

Else:

use Long DRX Cycle.

If drxShortCycleTimer expires in this subframe:

use the Long DRX Cycle.

If the Short DRX Cycle is used [(SFN*10)+subframe number] modulo (shortDRX-Cycle)=(drxStartOffset) modulo (shortDRX-Cycle); or If the Long DRX Cycle is used [(SFN*10)+subframe number] modulo (longDRX-Cycle)=drxStartOffset:

start on DurationTimer.

During Active Time, for a PDCCH-subframe, if the subframe is not required for UL transmission for a half-duplex FDD UE and if the subframe is not part of a configured measurement gap:

monitor a PDCCH.

If the PDCCH indicates DL transmission or if DL assignment has been configured for this subframe:

start the HARQ RTT timer for the corresponding HARQ process;

stop drx-RetransmissionTimer for the corresponding HARQ process.

If the PDCCH indicates a new (DL or UL) transmission:

start or restart drx-InactivityTimer.

When not in Active Time, if more than four subframes have elapsed after Active Time is ended, or if this subframe is one of four subframes after a subframe in which a UL grant for pending HARQ retransmission may occur and data is present in a corresponding HARQ buffer:

type-0-triggered SRS should not be reported.

If CQI masking (cqi-Mask) is setup by higher layers:

when on DurationTimer is not running, CQI/PMI/RI/PTI on a PUCCH should not be reported.

Else:

When not in Active Time, if more than four subframes have elapsed after Active Time is ended, or if this subframe is one of four subframes after a subframe in which a UL grant for pending HARQ retransmission may occur and data is present in a corresponding HARQ buffer:

CQI/PMI/RI/PTI on the PUCCH should not be reported.

Regardless of whether the UE is monitoring the PDCCH or not, the UE receives and transmits HARQ feedback and transmits type-1-triggered SRS when such is expected.

NOTE: The same active time is applied to resources operating in all activated serving carrier(s).

Figure 12:
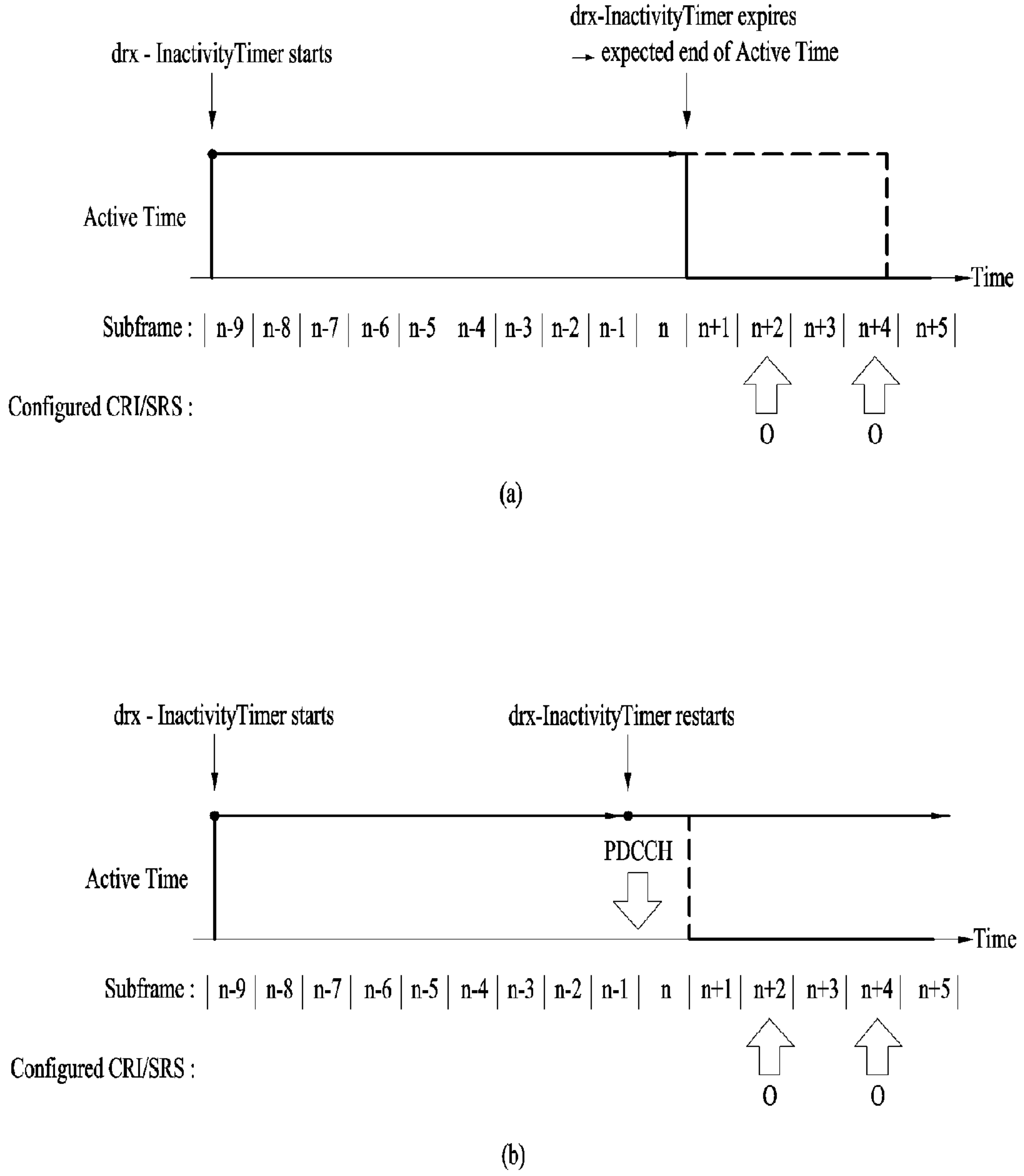
FIG. 12 illustrates exemplary CSI (Channel State Information)/SRS (Sounding Reference Signal) transmission according to an embodiment of the present invention.

FIG. 12 illustrates exemplary CSI/SRS transmission according to an embodiment of the present invention.

Referring to FIG. 12, a prescribed number of subframes after the last subframe of an active time may be limited to four subframes. In this case, if subframe n is the last subframe of the active time, a UE performs CSI/SRS transmission according to configuration of an eNB in subframes n+1, n+2, n+3, and n+4. For example, if CSI/SRS is configured to be transmitted in subframes n+2 and n+4, referring to FIG. 12(*a*), the UE transmits CSI/SRS even when subframes n+2 and n+4 are not the active time. Referring to FIG. 12(*b*), when CSI/SRS is configured to be transmitted in subframes n+2 and n+4 and even when subframes n+2 and n+4 are changed to the active time by reception of a PDCCH although these subframes are originally expected to be an inactive time, the UE performs CSI/SRS transmission in subframes n+2 and n+4 according to configuration of the eNB. That is, according to the present invention, uncertainty as to whether CSI/SRS having a transmission timing during a prescribed number of subframes after expected end of the active time will be transmitted by the UE is eliminated.

Figure 13:
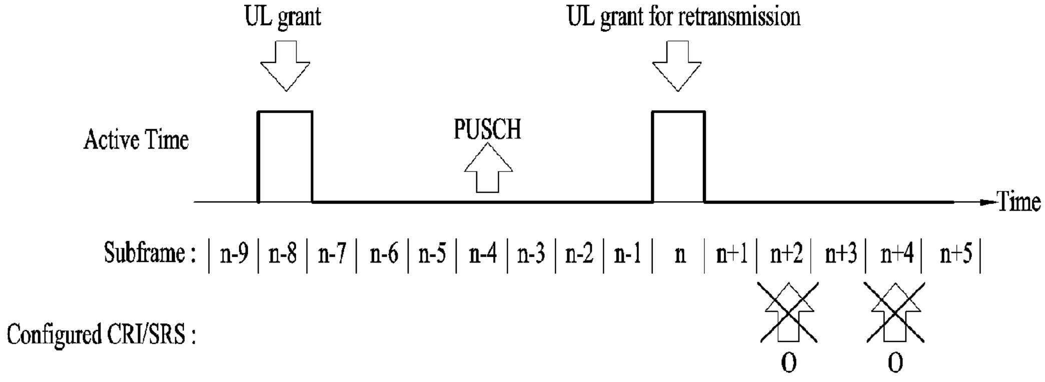
FIG. 13 illustrates another exemplary CSI/SRS transmission according to another embodiment of the present invention.

FIG. 13 illustrates another exemplary CSI/SRS transmission according to an embodiment of the present invention.

Notably, if subframe n, which is the last subframe of an active time, is a subframe for receiving UL radio resource assignment information for HARQ retransmission, a UE may not transmit CSI/SRS in subframe n+1 to subframe n+4. If data is stored in a HARQ buffer, the UE determines that a subframe corresponding to a (UL grant) transmission timing of a HARQ process associated with the HARQ buffer is the active time.

Referring to FIG. 13, if subframe n is a subframe in which a UL grant for retransmission of data transmitted through a PUSCH prior to subframe n has been received/to be received, the UE may not transmit CSI/SRS in subframe n+1 to subframe n+4. To receive the UL grant for HARQ retransmission, a short time, for example, 1 ms, becomes an active time. If the UE is forced to perform CSI/SRS transmission even in subframes after an intermittent short active time for receiving the UL grant for HARQ retransmission, this is inefficient in terms of UE battery use. Hence, according to the present invention, if the last subframe of the active time is a subframe in which the UE is turned "On" for a short time for receiving the UL grant for HARQ retransmission, the battery use efficiency of the UE is raised by causing the UE not to transmit CSI/SRS in a prescribed number of subframes after the last subframe.

In the present invention, an eNB configures a DRX operation and CSI/SRS transmission through higher layer (e.g.

RRC layer or MAC layer) signaling for the UE. The eNB may configure the UE such that the UE periodically transmits CSI/SRS. That is, the present invention may be restricted to a UE operation related to periodic CSI/SRS transmission. In addition, the present invention may be limitedly applied to CSI transmitted on a PUCCH.

If a subframe(s) following a prescribed number of subframes after the last subframe of an active time is an inactive time, the UE does not transmit CSI/SRS in a subframe(s) which is the inactive time.

Figure 14:
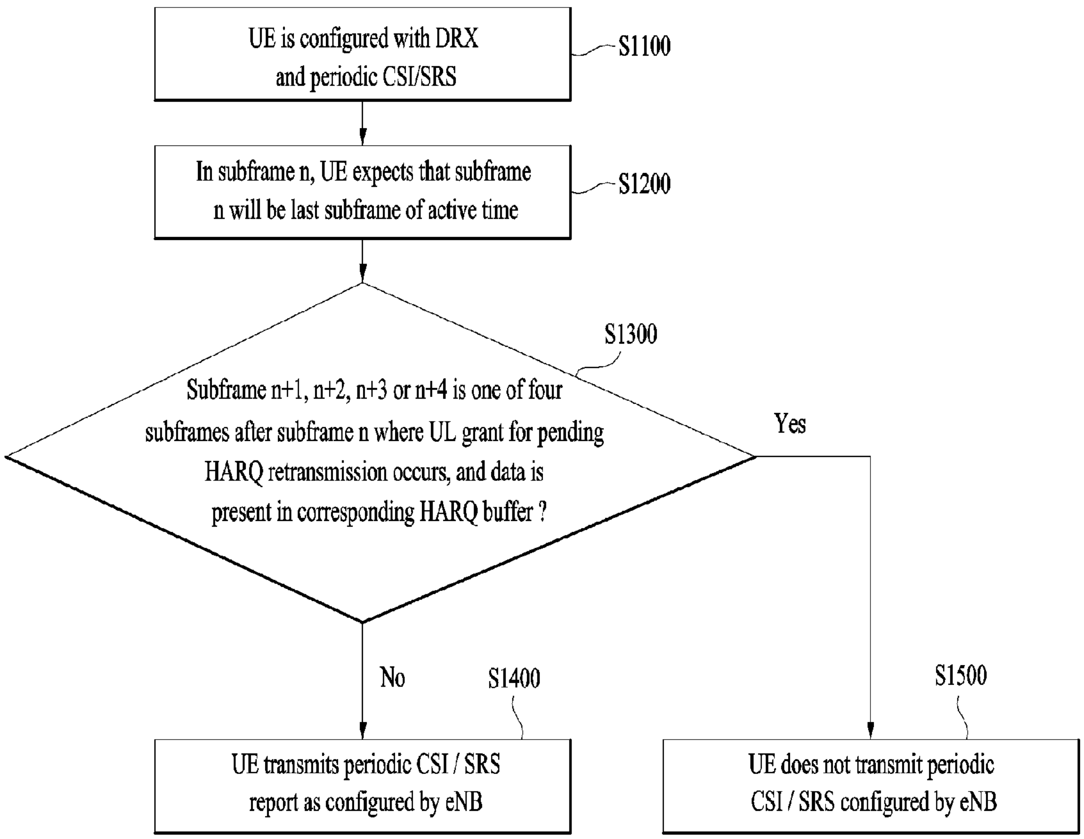
FIG. 14 is a flowchart illustrating CSI/SRS transmission by a UE (User Equipment) for which a DRX operation is configured according to the present invention.

FIG. 14 is a flowchart illustrating CSI-RS transmission by a UE configured to perform a DRX operation according to the present invention.

An eNB sets up a DRX configuration and a periodic CSI/SRS transmission related configuration for a UE (S1100). If a current subframe (hereinafter, subframe n) is the last subframe of an active time (S1200), the UE determines whether subframe n+1, subframe n+2, subframe n+3, or subframe n+4 is one of four subframes after an active time for receiving a PDCCH carrying a control signal for radio resource assignment for HARQ retransmission and an eNB configures the UE to transmit CSI/SRS in this subframe (subframe n+1, subframe n+2, subframe n+3, or subframe n+4) (S1300). That is, the UE determines whether a subframe corresponding to a periodic CSI/SRS transmission timing is one of four subframes after the last subframe of the active time and the last subframe of the active time is a subframe for receiving a UL grant for HARQ retransmission. The UE checks whether the CSI/SRS transmission timing is within a prescribed number of subframes after the active time. If the CSI/SRS transmission timing is within the prescribed number of subframes after the active time, the UE may check whether the active time is an active time for receiving resource assignment information for HARQ retransmission to determine whether to transmit the CSI/SRS at a corresponding transmission timing. If a condition of S1300 is not satisfied, the UE does not perform CSI/SRS transmission in subframe n+1 to subframe n+4 even when there is CSI/SRS transmission configured by the eNB to be performed by the UE (S1400). That is, if the subframe corresponding to the periodic CSI/SRS transmission timing is not one of subframes n+1, n+2, n+3, and n+4 or if subframe n, which is the last subframe of the active time, is a subframe in which a UL grant for HARQ retransmission may be present, the UE drops periodic CSI/SRS transmission without transmitting periodic CSI/SRS in a corresponding transmission timing. If the condition of S1300 is satisfied, the UE performs CSI/SRS transmission in a subframe corresponding to a CSI/SRS transmission timing configured by the eNB among subframes n+1 to n+4 (S1500). That is, if a subframe corresponding to the periodic CSI/SRS transmission timing is one of subframes n+1, n+2, n+3, and n+4 and subframe n, which is the last subframe of the active time, is not a subframe in which the UL grant for HARQ retransmission may be present, the UE transmits the periodic CSI/SRS at a corresponding transmission timing.

Figure 15:
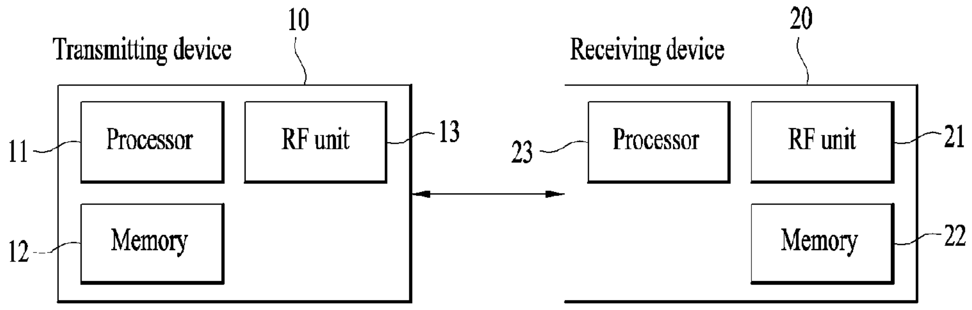
FIG. 15 is a block diagram illustrating elements of a transmitting device 10 and a receiver 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_r$ (where $N_r$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the eNB will be referred to as an eNB processor, an eNB RF unit, and an eNB memory, respectively.

According to the embodiments of the present invention, the eNB processor generates a higher layer signal associated with a DRX operation configuration, a higher layer signal for a CSI/SRS transmission related configuration, a PDCCH, and/or a PDSCH and controls the eNB RF unit to transmit the generated higher layer signals, the PDCCH, and/or the PDSCH, and the UE processor controls the UE RF unit to receive the higher layer signals, the PDCCH, and/or the PDSCH from the eNB. According to the embodiments of the present invention, the UE processor generates CSI and/or an SRS and controls the UE RF unit to transmit the generated CSI on a PUCCH and/or transmit the generated SRS, and the eNB processor controls the eNB RF unit to receive the CSI on the PUCCH or receive the SRS.

The eNB processor establishes a DRX configuration and a periodic CSI/SRS transmission related configuration for the UE. The eNB processor controls the eNB RF unit to transmit information about the established DRX configuration and periodic CSI/SRS configuration to the UE. The UE RF unit receives the information about the established DRX configuration and periodic CSI/SRS configuration from the eNB and transmits the information to the UE processor. The UE processor configures DRX for the UE according to the DRX configuration and configures the UE to transmit CSI/SRS according to the CSI/SRS configuration. The UE processor performs a DRX operation according to the DRX configuration. If a current subframe (hereinafter, subframe n) is the last subframe of an active time, the UE processor determines whether subframe n+1, subframe n+2, subframe n+3, or subframe n+4 is one of four subframes after the active time for receiving a PDCCH carrying a control signal for radio resource assignment for HARQ retransmission and whether the eNB configures the UE to transmit the CSI/SRS in this subframe (subframe n+1, subframe n+2, subframe n+3, or subframe n+4). If subframe n+1, subframe n+2, subframe n+3, or subframe n+4 is one of four subframes after the active time for receiving the PDCCH carrying the control signal for radio resource assignment for HARQ retransmission and the eNB configures the UE to transmit the CSI/SRS in this subframe (subframe n+1, subframe n+2, subframe n+3, or subframe n+4), the UE processor may control the UE RF unit not to transmit the CSI/SRS even when there is CSI/SRS transmission configured by the eNB to be performed by the UE in subframe n+1 to subframe n+4. Meanwhile, if subframe n+1, subframe n+2, subframe n+3, or subframe n+4 is not one of four subframes after the active time for receiving the PDCCH carrying the control signal for radio resource assignment for HARQ retransmission and the UE is configured to transmit the CSI/SRS in this subframe (subframe n+1, subframe n+2, subframe n+3, or subframe n+4), the UE processor controls the UE RF unit to transmit the CSI/SRS in a subframe corresponding to a CSI/SRS transmission timing configured by the eNB among subframes from subframe n+1 to subframe n+4. That is, the UE processor may determine whether the CSI/SRS transmission timing is within a prescribed number of subframes after the active time. If CSI/SRS transmission timing is within the prescribed number of subframes, the UE processor may determine whether the active time is an active time for receiving resource assignment information for HARQ retransmission to determine whether to transmit the CSI/SRS at a corresponding transmission timing and control the UE RF unit according to the determined result.

Hereinabove, while the present invention has been described by taking an example in which a prescribed number of subframes after an active time is four, other number of subframes may be defined according to capabilities of the UE processor.

According to the present invention, if the last subframe of the active time is regardless of reception of radio resource assignment information for HARQ retransmission, the UE performs CSI/SRS transmission as configured by the eNB during a prescribed number of subframe(s) after the last subframe of the active time. According to the present invention, increase in complexity of the eNB caused by uncertainty as to whether the UE performs CSI/SRS transmission after the active time can be prevented. In addition, power consumption of the UE can be reduced by causing the UE not to perform CSI/SRS transmission in a subframe after a short active time for receiving a PDCCH for radio resource assignment for HARQ retransmission.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a relay, a UE, or other devices in a wireless communication system.

The invention claimed is:

1. A method for transmitting an uplink control signal to a base station by a user equipment for which discontinuous reception is configured, the method comprising:

if a first subframe corresponding to transmission timing of the uplink control signal is not within an active time, determining whether to transmit the uplink control signal in the first subframe according to whether the first subframe is one of a prescribed number of subframes after a last subframe of the active time and according to whether the last subframe of the active time is a second subframe that is included in the active time as the second subframe is a time while an uplink grant for a pending hybrid automatic repeat and request (HARQ) retransmission can occur and there is data in a corresponding HARQ buffer; and transmitting the uplink control signal in the first subframe when the first subframe is one of the prescribed number of subframes after the last subframe of the active time and when the last subframe of the active time is not the second subframe, regardless of whether a physical downlink control channel is received at the last subframe of the active time, and not transmitting the uplink control signal in the first subframe when more than four subframes pass since the last subframe of the active time or when the first subframe is one of the prescribed number of subframes after the last subframe of the active time corresponding to the second subframe.

2. The method according to claim 1, wherein whether the first subframe is one of the prescribed number of subframes after the last subframe of the active time is determined and then, if the first subframe is one of the prescribed number of subframes after the last subframe of the active time, whether the last subframe of the active time is the second subframe is determined.

3. The method according to claim 1, wherein the uplink control signal is at least a periodic channel state information report or a periodic sounding reference signal.

4. The method according to claim 3, wherein, if the uplink control signal is the periodic channel state information report, the uplink control signal is transmitted through an uplink physical control channel.

5. A user equipment for transmitting an uplink control signal to a base station, for which discontinuous reception is configured, the user equipment comprising:

a radio frequency (RF) unit configured to transmit a signal; and a processor configured to control the RF unit, the processor configured to:

if a first subframe corresponding to transmission timing of the uplink control signal is not within an active time, determine whether to transmit the uplink control signal in the first subframe according to whether the first subframe is one of a prescribed number of subframes after a last subframe of the active time and according to whether the last subframe of the active time is a second subframe that is included in the active time as the second subframe is a time while an uplink grant for a pending hybrid automatic repeat and request (HARQ) retransmission can occur and there is data in a corresponding HARQ; and control the RF unit to transmit the uplink control signal in the first subframe when the first subframe is one of the prescribed number of subframes after the last subframe of the active time and when the last subframe of the active time is not the second subframe, regardless of whether a physical downlink control channel is received at the last subframe of the active time, and control the RF unit not to transmit the uplink control signal in the first subframe when more than four subframes pass since the last subframe of the active time or when the first subframe is one of the prescribed number of subframes after the last subframe of the active time corresponding to the second subframe.

6. The user equipment according to claim 5, wherein the processor is configured to determine whether the first subframe is one of the prescribed number of subframes after the last subframe of the active time and then, if the first subframe is one of the prescribed number of subframes after the last of the active time, the processor is configured to determine whether the last subframe of the active time is the second subframe.

7. The user equipment according to claim 5, wherein the uplink control signal is at least a periodic channel state information report or a periodic sounding reference signal.

8. A method for receiving, by a base station, an uplink control signal from a user equipment for which discontinuous reception is configured, the method comprising:

if a first subframe corresponding to reception timing of the uplink control signal is not within an active time, determining whether to receive the uplink control signal in the first subframe according to whether the first subframe is one of a prescribed number of subframes after a last subframe of the active time and according to whether the last subframe of the active time is a second subframe that is included in the active time as the second subframe is a time while an uplink grant for a pending hybrid automatic repeat and request (HARQ) retransmission can occur and there is data in a corresponding HARQ buffer; and receiving the uplink control signal in the first subframe when the first subframe is one of the prescribed number of subframes after the last subframe of the active time and when the last subframe of the active time is not the second subframe, regardless of whether a physical downlink control channel is transmitted to the user equipment at the last subframe of the active time, and not receiving the uplink control signal in the first subframe when more than four subframes pass since the last subframe of the active time or when the first subframe is one of the prescribed number of subframes after the last subframe of the active time corresponding to the second subframe.

9. A base station for receiving an uplink control signal from a user equipment for which discontinuous reception is configured, the base station comprising:

a radio frequency (RF) unit configured to transmit a signal; and a processor configured to control the RF unit, the processor configured to:

if a first subframe corresponding to reception timing of the uplink control signal is not within an active time, determine whether to receive the uplink control signal in the first subframe according to whether the first subframe is one of a prescribed number of subframes after a last subframe of the active time and according to whether the last subframe of the active time is a second subframe that is included in the active time as the second subframe is a time while an uplink grant for a pending hybrid automatic repeat and request (HARQ) retransmission can occur and there is data in a corresponding HARQ buffer; and control the RF unit to receive the uplink control signal in the first subframe when the first subframe is one of the prescribed number of subframes after the last subframe of the active time and when the last subframe of the active time is not the second subframe, regardless of whether a physical downlink control channel is transmitted to the user equipment at the last subframe of the active time, and not control the RF unit not to receive the uplink control signal in the first subframe when more than four subframes pass since the last subframe of the active time or when the first subframe is one of the prescribed number of subframes after the last subframe of the active time corresponding to the second subframe.

10. The user equipment according to claim 7, wherein, if the uplink control signal is the periodic channel state information report, the uplink control signal is transmitted through an uplink physical control channel.

11. The method according to claim 8, wherein whether the first subframe is one of the prescribed number of subframes after the last subframe of the active time is determined and then, if the first subframe is one of the prescribed number of subframes after the last subframe of the active time, whether the last subframe of the active time is the second subframe is determined.

12. The method according to claim 8, wherein the uplink control signal is at least a periodic channel state information report or a periodic sounding reference signal.

13. The method according to claim 12, wherein, if the uplink control signal is the periodic channel state information report, the uplink control signal is received through an uplink physical control channel.

14. The base station according to claim 9, wherein the processor is configured to determine whether the first subframe is one of the prescribed number of subframes after the last subframe of the active time and then, if the first subframe is one of the prescribed number of subframes after the last of the active time, the processor is configured to determine whether the last subframe of the active time is the second subframe.

15. The base station according to claim 9, wherein the uplink control signal is at least a periodic channel state information report or a periodic sounding reference signal.

16. The base station according to claim 12, wherein, if the uplink control signal is the periodic channel state information report, the uplink control signal is received through an uplink physical control channel.

* * * * *